(12) United States Patent
Fujita et al.

(10) Patent No.: US 6,516,115 B1
(45) Date of Patent: Feb. 4, 2003

(54) TWO-WAY OPTICAL COMMUNICATION DEVICE AND TWO-WAY OPTICAL COMMUNICATION APPARATUS

(75) Inventors: Hideaki Fujita, Shiki-gun (JP); Yorishige Ishii, Yamatotakada (JP); Yoshifumi Iwai, Tenri (JP); Toshiyuki Matushima, Nara (JP); Toshihiro Tamura, Shiki-gun (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/506,308

(22) Filed: Feb. 17, 2000

(30) Foreign Application Priority Data

Feb. 17, 1999 (JP) .......................... 11-038256

(51) Int. Cl.⁷ ................................................ G02B 6/42
(52) U.S. Cl. ............................................ 385/31; 385/88
(58) Field of Search ............................ 385/31, 33, 36, 385/38, 39, 47, 18, 88–94

(56) References Cited

U.S. PATENT DOCUMENTS

| | | | | |
|---|---|---|---|---|
| 4,143,941 A | * | 3/1979 | Soref ......................... | 359/109 |
| 4,182,544 A | * | 1/1980 | McMahon ................... | 359/115 |
| 4,701,010 A | * | 10/1987 | Roberts ....................... | 385/88 |
| 4,707,056 A | * | 11/1987 | Bittner ........................ | 385/37 |
| 4,763,978 A | * | 8/1988 | Courtney-Pratt et al. ..... | 385/47 |
| 4,993,796 A | * | 2/1991 | Kapany et al. ........ | 250/227.11 |
| 5,416,624 A | * | 5/1995 | Karstensen ................. | 359/114 |
| 5,479,540 A | * | 12/1995 | Boudreau et al. ............ | 359/152 |
| 6,004,046 A | * | 12/1999 | Sawada ........................ | 385/92 |
| 6,188,495 B1 | * | 2/2001 | Inoue et al. ................. | 359/122 |
| 6,282,006 B1 | * | 8/2001 | Tamada et al. .............. | 359/152 |
| 6,334,716 B1 | * | 1/2002 | Ojima et al. ................. | 359/152 |
| 6,351,584 B1 | * | 2/2002 | Horie et al. .................. | 385/31 |
| 6,454,467 B1 | * | 9/2002 | Ishihara et al. .............. | 359/124 |

FOREIGN PATENT DOCUMENTS

| | | |
|---|---|---|
| JP | 62-222211 A | 9/1987 |
| JP | 1-108511 A | 4/1989 |
| JP | 3-243905 A | 10/1991 |
| JP | 9-251119 | 9/1997 |
| JP | 10-115732 | 5/1998 |

* cited by examiner

*Primary Examiner*—Ellen E. Kim
(74) *Attorney, Agent, or Firm*—David G. Conlin; Peter J. Manus; Dike Bronstein Roberts & Cushman Intellectual Property Pratice Group

(57) ABSTRACT

In a two-way optical communication device, a rising mirror bends light transmitted from a light-emitting element in a virtually perpendicular direction to a surface of a substrate, and the light is gathered on an end of an optical fiber via a light-gathering mirror having a curved surface and is coupled to the optical fiber. Further, in the two-way optical communication device, received light, that is propagated from the optical fiber, is reflected on the light-gathering mirror and is gathered on the light-receiving element. The two-way optical communication device can transmit and receive light through a single optical fiber, causing only small loss in transmission and reception, so that light can be efficiently coupled to an optical fiber such as a POF having a large diameter.

15 Claims, 5 Drawing Sheets

TWO-WAY OPTICAL COMMUNICATION DEVICE AND TWO-WAY OPTICAL COMMUNICATION APPARATUS

FIELD OF THE INVENTION

This invention relates to a two-way optical communication device which is capable of two-way transmission and reception of an optical signal, more specifically, the two-way optical communication device for home communication, communication between electronic devices, a LAN (Local Area Network), etc., that uses a multimode optical fiber such as a plastic optical fiber as a transmitting medium, and this invention further concerns a two-way optical communication apparatus which uses the two-way communication device.

BACKGROUND OF THE INVENTION

Conventionally, regarding an optical communication device which transmits and receives signal light by using an optical fiber serving as a transmitting medium, a number of methods have been proposed for coupling an optical fiber to a light-emitting element and a light-receiving element. For example, Japanese Laid-Open Patent Publication No.222211/1987 (Tokukaisho 62-222211, published in September, 1987) and Japanese Laid-Open Patent Publication No.108511/1989 (Tokukaihei 1-108511, published in April, 1989) disclose a method for coupling a light-emitting element to an optical fiber by using a concave mirror. Referring to FIG. 9, the following explanation describes this method.

Transmitted light from a light-emitting element 105 is radiated onto a concave mirror 103. The concave mirror 103 is formed with a rotating elliptic surface. The end faces of the light-emitting element 105 and the optical fiber 102 are respectively disposed on focal positions of the concave mirror 103. Thus, the transmitted light, that is emitted onto the concave mirror 103, is reflected thereon. And the light is gathered on the end face of the optical fiber 102 and is coupled to the optical fiber 102.

However, the methods disclosed in Japanese Laid-Open Patent Publication No.222211/1987 (Tokukaisho 62-222211) and Japanese Laid-Open Patent Publication No.108511/1989 (Tokukaihei 1-108511) relate to a light-emitting module only for coupling light transmitted from a light-emitting element to an optical fiber. In the case of two-way transmission and reception, coupling optical systems are required for both transmitted light and received light, so that two optical fibers are necessary.

In order to avoid a complicated arrangement of two optical fibers, it is desirable to transmit and receive light by using a single optical fiber. However, in the case of the two-way optical communication device using a single optical fiber, it is necessary to adopt a method for separating transmitted light and received light upon coupling light to the optical fiber.

For instance, methods have been conventionally proposed including a method using a hologram (Japanese Laid-Open Patent Publication No.243905/1991 (Tokukaihei 3-243905, published in October, 1991)) and a method using a half mirror (Japanese Laid-Open Patent Publication No.115732/1998 (Tokukaihei 10-115732, published in May, 1998)).

However, these methods have a disadvantage of causing about 3 dB loss upon separating transmitted light and received light. Further, a separating element is necessary for separating transmitted and received light, so that the cost is increased and a smaller model cannot be readily achieved.

Moreover, the following method is disclosed in Japanese Laid-Open Patent Publication No.251119/1997 (Tokukaihei 9-251119, published on Sep. 22, 1997): both of a light-receiving element and a light-emitting element are disposed around an optical axis of an optical fiber and the elements are coupled to the optical fiber through a lens. Referring to FIG. 10, the following explanation describes this method.

A light-emitting element 205 is disposed on a line extended from an optical path of an optical fiber 202. A light-receiving element 204 is disposed such that a side is positioned close to a base line, which connects the optical fiber 202 and the light-emitting element 205. Received light that is propagated through the optical fiber 202 is refracted in a lens 210 and is coupled to the light-receiving element 204. Meanwhile, transmitted light that is emitted from the light-emitting element 205 is refracted in the lens 210 and is coupled to the optical fiber 202. The transmitted light and the received light are not separated from each other in this method, so that it is possible to obtain a small two-way optical communication device at low cost.

However, in such a method, the optical axes of the light-emitting element 205 and the light-receiving element 204 are brought close to each other, so that transmitted light is partly interrupted or about half of light received from the optical fiber 202 is not coupled to the light-receiving element 204, resulting in a large loss.

Furthermore, when an optical fiber having a large diameter, for example, a plastic optical fiber (hereinafter, referred to as POF) is used as the optical fiber 202, the lens 210 cannot sufficiently gather light. Particularly, in the case of high speed communication, it is necessary to reduce a light-receiving area of the light-receiving element 204 in view of electrostatic capacitance. However, in this case, it is difficult to gather multimode light, that is received from the POF having a core diameter of about 1 mm, in the lens 210 in order to obtain a high coupling efficiency on the light-receiving element 204 having a small light-receiving area.

SUMMARY OF THE INVENTION

The present invention is devised to solve the above-mentioned problem. The objective is to provide an inexpensive and small two-way optical communication device, that can transmit and receive light by using a single optical fiber with a small loss and can efficiently couple light to an optical fiber such as a POF having a large diameter without necessity for a separating element for transmission and reception, and to provide a two-way communication apparatus using the device.

The two-way optical communication device of the present invention includes a light-emitting element for emitting transmitted light to be propagated via an optical fiber, a light-receiving element for receiving light propagated via the optical fiber, and a light-gathering mirror which reflects the transmitted light so as to couple the light to an end face of the optical fiber and reflects the received light emitted from the end face so as to emit the light to the light-receiving element.

According to this arrangement, the light-gathering mirror is used at the time that light received from the optical fiber is gathered and is coupled to the light-receiving element, so that a curvature of the light-gathering mirror is varied so as to readily change a light-gathering state. For example, even in the case of an optical fiber such as a POF having a large diameter, light can be coupled to the light-receiving element with high efficiency.

Further, in this arrangement, transmitted light is coupled to the optical fiber via the same light-gathering mirror, so that transmission and reception is possible with a single optical fiber and it is not necessary to separate transmitted light and received light; consequently, a small two-way optical communication device can be obtained at low cost.

The two-way optical communication apparatus of the present invention, which includes a plurality of the two-way optical communication devices, each being optically coupled to each end of the optical fiber so as to conduct two-way optical communication, wherein at least one of a plurality of the two-way optical communication devices includes a light-gathering mirror, and the light-gathering mirror reflects light transmitted from the light-emitting element so as to couple the light to an end of the optical fiber and the mirror reflects light received from the end of the optical fiber so as to emit the light onto the light-receiving element.

According to this arrangement, the light-gathering mirror is used at the time that light received from the optical fiber is gathered and is coupled to the light-receiving element, so that a curvature of the light-gathering mirror is varied so as to readily change a light-gathering state. For example, even in the case of an optical fiber such as a POF having a large diameter, it is possible to couple light to the light-receiving element with high efficiency.

Moreover, transmitted light is coupled to the optical fiber via the same light-gathering mirror, so that transmission and reception are possible with a single optical fiber and it is not necessary to separate transmitted light and received light; consequently, a small two-way optical communication apparatus can be obtained at low cost.

For a fuller understanding of the nature and advantages of the invention, reference should be made to the ensuing detailed description taken in conjunction with the accompanying drawings.

DESCRIPTION OF THE EMBODIMENTS

[Embodiment 1]

Figure 1:
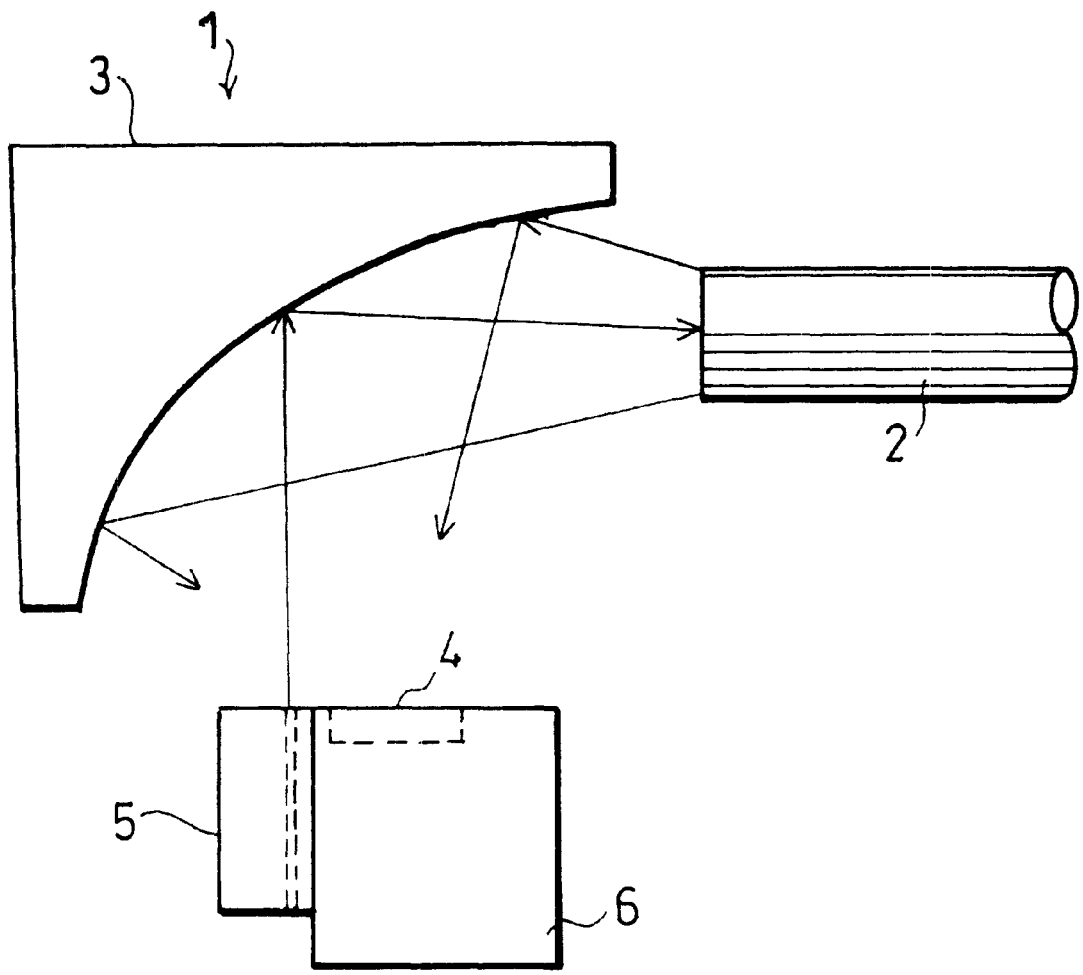
FIG. 1 is a sectional view schematically showing a construction of a two-way optical communication device in accordance with Embodiment 1 of the present invention.
Figure 2:
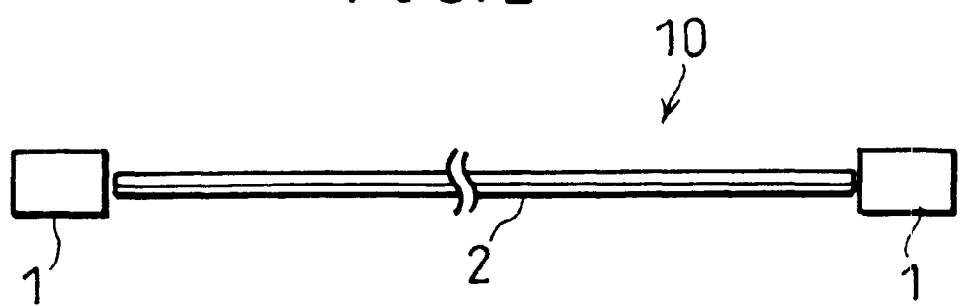
FIG. 2 is a schematic diagram showing a construction of the two-way optical communication device of the present invention.
Figure 3:
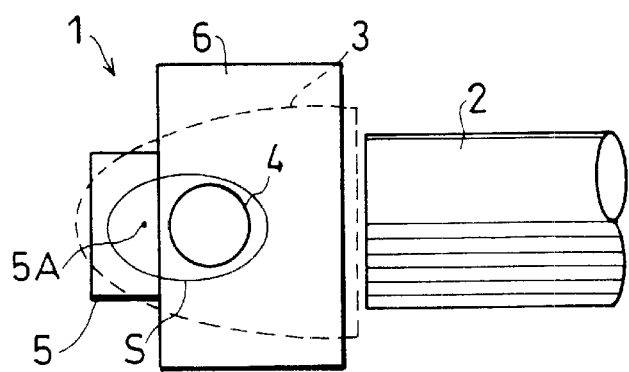
FIG. 3 is a plan view schematically showing the two-way optical communication device of FIG. 1.

Referring to FIGS. 1 through 3, the following explanation describes Embodiment 1 of the present invention. FIG. 2 is a schematic diagram showing a construction of a two-way optical communication link (two-way optical communication apparatus) of Embodiment 1. The two-way optical communication link 10 is provided with an optical fiber 2 for bidirectionally transmitting modulated light, that is suitable for transmission, in accordance with a transmitted data signal, and two-way optical communication devices 1 which are disposed so as to be optically coupled to both ends of the optical fiber 2.

FIG. 1 is a schematic drawing showing a sectional view of the two-way optical communication device of the present invention. FIG. 3 is a plan view showing the arrangement of a light-emitting element 5 and a light-receiving element 4 in the two-way optical communication device of FIG. 1. Referring to FIGS. 1 and 3, the following explanation describes an example of the present invention.

The two-way optical communication device 1 is provided with the light-emitting element 5 for generating modulated light in accordance with a data signal, the light-receiving element 4 receiving modulated light from the optical fiber 2 for generating a data signal, a light-gathering mirror 3 with a curved surface for optically coupling the light-emitting element 5 and the light-receiving element 4, and the optical fiber 2.

The light-emitting element 5 is disposed in a hybrid form on a side of a substrate 6, on which the light-receiving element 4 is formed in a monolithic manner. Transmitted light is emitted from an emitting point 5A (see FIG. 3) of the light-emitting element 5, and the optical path of the transmitted light is bent in a direction of an end face of the optical fiber 2, at the light-gathering mirror 3. And on a mirror of the curved surface of the light-gathering mirror 3, diverged light is gathered to the end face of the optical fiber 2.

Meanwhile, received light, that is radiated from the end face of the optical fiber 2, is diverged in accordance with an NA (numerical aperture) of the optical fiber 2. The received light is bent to the light-receiving element 4 and is gathered on the light-gathering mirror 3 so as to be emitted into the light-receiving element 4 as a light-gathering spot S (see FIG. 3).

The light-gathering mirror 3 has a curved surface such as a rotating elliptic surface. The light-gathering mirror 3 is discussed later. As the optical fiber 2, it is preferable to adopt a multimode optical fiber such as a POF. The POF includes a core and a clad which covers the rim of the core. The core is made of a plastic such as PMMA (PolyMetylMethAcrylate) and polycarbonate having a superior light-transmitting property. The clad is made of a plastic whose refractive index is lower than that of the core.

In such an optical fiber 2, as compared with a quartz optical fiber, it is easy to set a large core diameter between about 200 $\mu$m to about 1 mm. Hence, it is possible to obtain the two-way optical communication link 10 at a low price, that can be readily adjusted when being coupled to the two-way optical communication devices 1.

Further, as the optical fiber 2, it is also possible to adopt a PCF in which a core is made of quartz glass and a clad is made of polymers. The PCF has a core diameter of about 200 $\mu$m and the price is higher than the POF; however, a transmission loss is small and a transmission band is wide. Therefore, the PCF is adopted as a transmitting medium so as to obtain the two-way optical communication link 10 which can achieve a long-distance and high-speed communication.

As the light-emitting element 5, for example, a semiconductor laser made of a material such as AlGaAs and GaInAlP and a light-emitting diode (LED) are adopted. In the case of the light-emitting element 5 of a surface emitting type such as an LED, the optical axis rotates 90° from the light-emitting element 5 of an end face emitting type, so that the light-emitting element 5 is disposed beside the light-receiving element 4 on the substrate 6.

As the light-receiving element 4, a photodiode is used, in which the intensity of received and modulated light is changed into an electronic signal and high sensitivity is exhibited in a wavelength area of the light-emitting element 5. For example, it is possible to adopt a photodiode such as a PIN (Positive-Intrinsic-Negative) photodiode made of a material such as silicon, and an avalanche photodiode. Moreover, the light-receiving element 4 can be also disposed in a hybrid form on the substrate 6.

The above explanation discussed the construction of the two-way optical communication device 1 in accordance with the present embodiment. In the present embodiment, the light-gathering mirror 3 has the following functions: ① light transmitted from the light-emitting element 5 is coupled to the optical fiber 2, and ② light received from the optical fiber 2 is coupled to the light-receiving element 4.

The following explanation discusses the detail of the light-gathering mirror 3.

In ①, light transmitted from the light-emitting element 5 is coupled to the optical fiber 2. When the transmitted light is emitted to the center of the end face of the optical fiber 2 in parallel with the optical axis, the coupling efficiency is maximized. Meanwhile, in ②, received light received is coupled to the light-receiving element 4. When the received light is gathered on the center of the light-receiving area on the light-receiving element 4, the amount of the received light is maximized, thereby improving the efficiency. However, it is not possible to perfectly satisfy ① and ② with a single light-gathering mirror 3.

Therefore, in the present invention, at least a part of an area for reflecting transmitted light and at least a part of an area for reflecting received light overlap each other on the light-gathering mirror 3. With this arrangement, the light-gathering mirror 3 can receive light transmitted from the optical fiber 2 in parallel with the optical axis and can transmit light virtually in parallel with the optical axis of the optical fiber 2, thereby achieving high efficiency. Further, the two-way optical communication device 1 can be smaller.

Additionally, as for the light-gathering mirror 3, in view of the usage of the two-way optical communication device 1, it is necessary to adjust the shape of the reflecting surface in accordance with the shapes, characteristics, and arrangements of the light-emitting element 5, the light-receiving element 4, and the optical fiber 2, so as to set efficiency of coupling transmitted light to the optical fiber 2 and efficiency of emitting received light to the light-receiving element 4, at target values or more.

Moreover, when the mirror surface of the light-gathering mirror 3 is a rotating elliptic surface, one of the focuses is disposed around the emitting point 5A of the light-emitting element 5 and the center of the light-receiving area of the light-receiving element 4 so as to efficiently use transmitted light and received light in a favorable manner. Here, in this case, it is desirable to dispose the end face of the optical fiber 2 on a straight line connecting the reflecting surface of the light-gathering mirror 3 and the other focus of the rotating elliptic surface.

The following explanation discusses a variation of the light-gathering mirror 3 of the present embodiment.

(Variation 1)

Generally, as for a ray bundle emitted to the optical fiber 2, the smaller an NA is, the smaller mode dispersion is, so that light can be favorably transmitted particularly at a high speed. Meanwhile, when an NA is large, coupling to the optical fiber 2 cannot be completed, causing loss. Therefore, normally, an NA of light transmitted from a light-emitting element 5 is changed to be smaller through a lens and others, and the light is coupled to the optical fiber.

Figure 4:
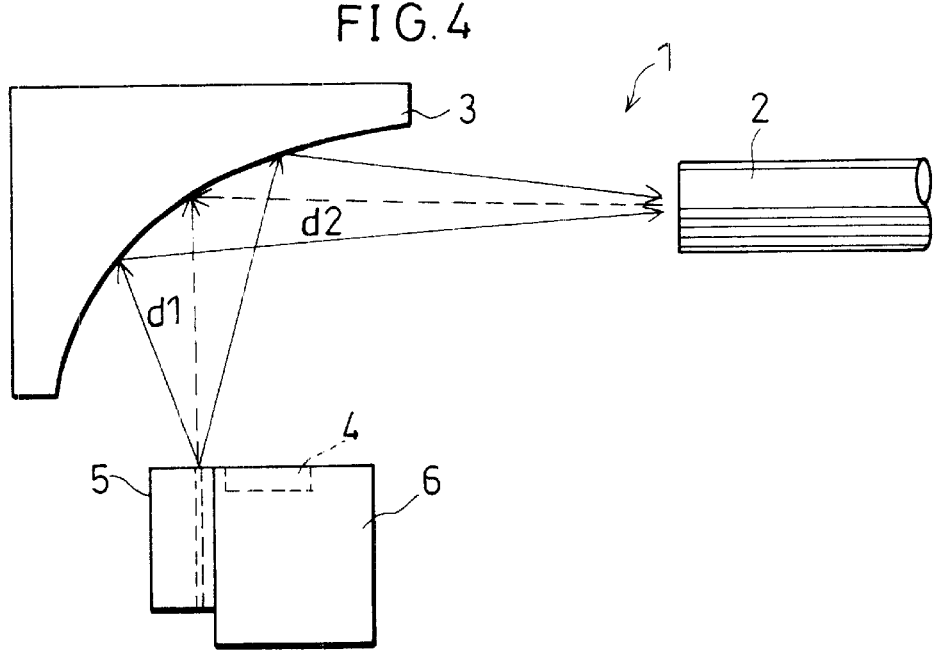
FIG. 4 is a sectional view schematically showing Variation 1 of a light-gathering mirror.

The light-gathering mirror 3 of the present invention can also change an NA of the transmitted light. FIG. 4 is a sectional view schematically showing the light-gathering mirror 3 of Variation 1.

As shown in FIG. 4, a distance d2 between the light-gathering mirror 3 and the end face of the optical fiber 2 is larger than a distance d1 between the emitting point 5A of the light-emitting element 5 and the light-gathering mirror 3. Further, the curved surface of the light-gathering mirror 3 is optimized so as to gather transmitted light on the optical fiber 2. This arrangement makes it possible to change an NA of transmitted light into smaller one without using a lens for changing an NA so as to direct the light to the optical fiber 2; consequently, an inexpensive two-way optical communication device can be efficiently achieved with a simple construction.

(Variation 2)

Figure 5:
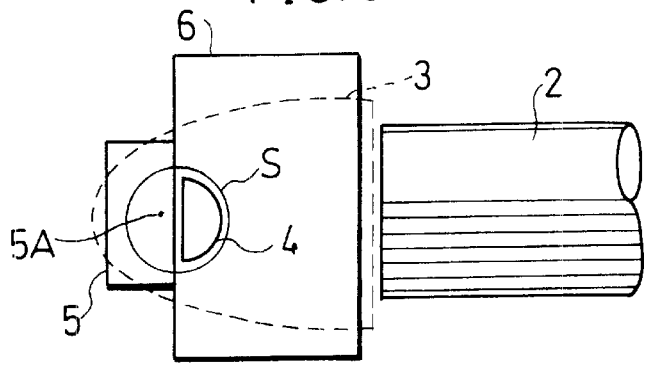
FIG. 5 is a sectional view schematically showing Variation 2 of the light-gathering mirror.

In Embodiment 1, the light-emitting element 5, the light-receiving element 4, and the light-gathering spot S are arranged as shown in FIG. 3. However, the present invention is not limited to this arrangement. For example, as shown in FIG. 5, when the light-receiving element 4 is formed into a bow shape (central angle is 180° or more) such as a semi-circle, the light-gathering spot S can be formed virtually into a circle with a small spot diameter, thereby achieving a high efficiency.

(Variation 3)

In Embodiment 1, the reflecting surface of the light-gathering mirror 3 is seamlessly formed by a smoothly curved surface; however, the reflecting surface can be formed by separated surfaces. For example, a part of the reflecting surface of the light-gathering mirror 3 is formed by a curved surface being suitable for coupling transmitted light to the optical fiber 2, and the other part of the reflecting surface of the light-gathering mirror 3 is formed by a curved surface being suitable for emitting received light onto the light-receiving element 4; thus, it is possible to increase efficiency of utilizing light both for coupling transmitted light and for emitting received light.

(Variation 4)

Further, upon arranging the shape of the reflecting surface of the light-gathering mirror 3, it is desirable to reduce an area on which light transmitted from the light-emitting element 5 is emitted onto the light-gathering mirror 3. This arrangement can be achieved by, for example, disposing an optical component such as a lens between the light-emitting element 5 and the light-gathering mirror 3. This arrangement makes it possible to reduce divergence of light transmitted to the light-gathering mirror 3, so that it is easier to gather transmitted light onto the optical fiber 2. Moreover, transmitted light can be efficiently coupled to the optical fiber 2 and received light can be efficiently emitted onto the light-receiving element 4.

In the two-way optical communication device 1 and the two-way optical communication link 10 of Embodiment 1 (and Variations 1 to 4), transmitted light and received light are coupled to the optical fiber 2 with a single light-gathering mirror 3; thus, a separating element for transmitted light and received light is not necessary, so that transmission and reception can be realized with a single optical fiber 2.

Furthermore, without using a lens, the light-gathering mirror 3 provides an optical coupling between the optical fiber 2 and the light-receiving element 4; hence, a curvature of the light-gathering mirror 3 is optimized so as to efficiently couple received light to the light-receiving element 4 even in the case of the optical fiber 2 such as a POF having a large diameter.

Moreover, with the light-gathering mirror 3, it is possible to reduce an NA of the transmitted light that is emitted from the light-emitting element 5, before coupling the light to the optical fiber 2, so that transmitted light can be more efficiently coupled to the optical fiber 2.

[Embodiment 2]

Figure 6:
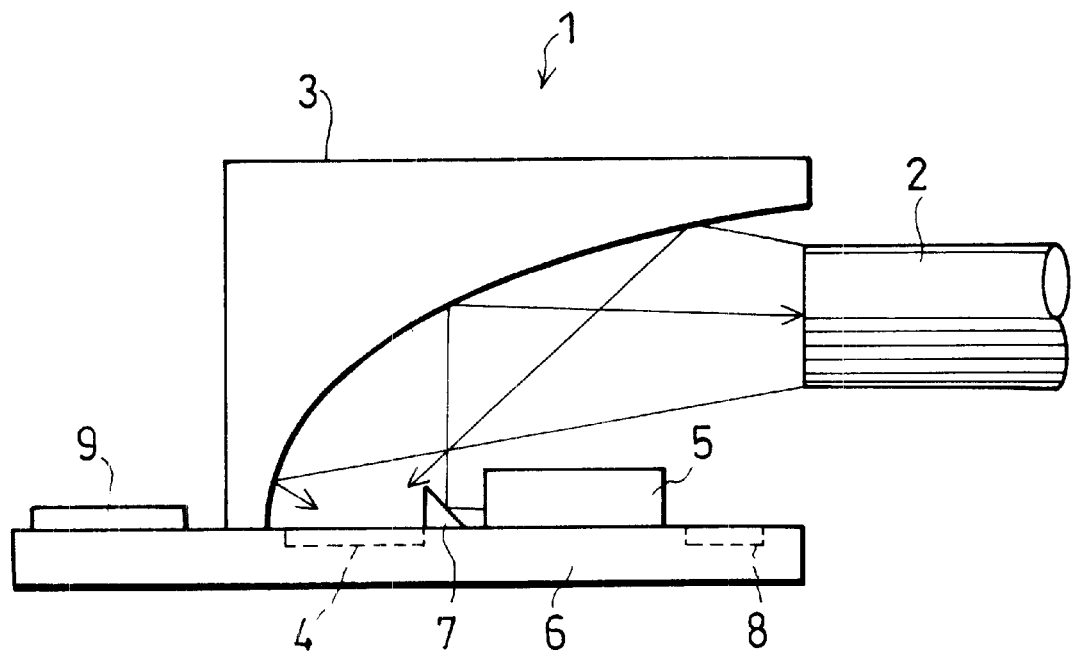
FIG. 6 is a sectional view schematically showing a construction of a two-way optical communication device in accordance with Embodiment 2 of the present invention.
Figure 7:
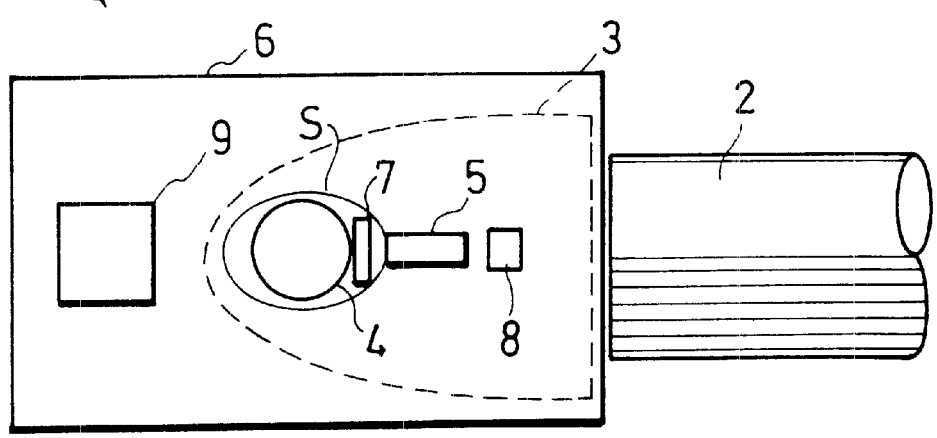
FIG. 7 is a plan view schematically showing the two-way optical communication device of FIG. 6.

Referring to FIGS. 6 and 7, the following explanation describes Embodiment 2. FIG. 6 is a sectional view schematically showing a two-way optical communication device 1 of the present embodiment, and FIG. 7 is a plan view thereof. Here, in the present embodiment, those members that have the same functions and that are described in Embodiment 1 are indicated by the same reference numerals and the description thereof is omitted.

In the present embodiment, for example, optical components and control components are integrated onto a substrate 6 made of a material such as single-crystal silicon. On the substrate 6, a light-receiving element 4 is monolithically formed by a PIN photodiode and others such that the receiving surface is disposed in parallel with the surface of the substrate 6. Moreover, on the substrate 6, a light-emitting element 5 such as a semiconductor laser and an end-surface emitting LED is disposed such that the emitting direction of light transmitted from the light-emitting element 5 is in parallel with the surface of the substrate 6. The light-receiving element 4 and the light-emitting element 5 are disposed so as to be adjacent to each other in a hybrid manner on the substrate 6.

Moreover, around (virtually adjacent to) the light-receiving element 4 on an optical axis of light transmitted from the light-emitting element 5, a rising(standing) mirror 7 is formed for changing the direction of an optical axis of light emitted from the light-emitting element 5, into a direction of the light-gathering mirror 3. Additionally, on the substrate 6, a monitoring photodiode 8 is provided for receiving part of light emitted from the light-emitting element 5 so as to detect intensity of transmitted light, and a control device 9 is provided for controlling the operations of the light-emitting element 5 and the light-receiving element 4.

The optical path of light transmitted from the light-emitting element 5 is bent at the rising mirror 7 so as to be, for example, perpendicular to the surface of the substrate 6, and the light reaches the light-gathering mirror 3. And then, the light is gathered on the light-gathering mirror 3 and is coupled to the optical fiber 2. Here, the rising mirror 7 merely needs to gather light transmitted from the light-emitting element 5 onto the optical fiber 2 via the light-gathering mirror 3. For instance, the rising mirror 7 can also reflect transmitted light onto one of the focuses of the light-gathering mirror 3. Received light emitted from the optical fiber 2 changes its direction on the light-gathering mirror 3, and the light is gathered thereon and is coupled to the light-receiving element 4.

Light transmitted from the light-emitting element 5 is partially received and monitored on the monitoring photodiode 8. Based on the monitoring result, the output of the light-emitting element 5 is adjusted by a feedback control so as to set the intensity of light emitted from the light-emitting element 5 at a fixed level. As the monitoring photodiode 8, for example, it is possible to adopt a photodiode such as a PIN photodiode made of silicon. The monitoring photodiode 8 can be also embedded into the substrate 6.

The control device 9 decodes an electronic signal of light, which is received on the light-receiving element 4, into a data signal, controls the output of the light-emitting element 5, and controls the output of the light-emitting element 5 based on monitoring light received from the monitoring photodiode 8.

The rising mirror 7 can be formed into a tapered shape, for example, by performing operations including cutting and laser abrasion on a resin such as polyimide, and forming a reflecting film made of a material such as Al and Au on the surface of the mirror. Or it is possible to process the surface of the substrate 6 by anisotropic etching. It is preferable to set an angle of the mirror surface at about 45° relative to the substrate 6; however, the angel can be selected arbitrarily so as to increase the degree of freedom in the arrangement.

Further, in order to receive light more efficiently in the light-receiving element 4, the back of the rising mirror 7 (side facing the light-receiving element 4) can be polished to a mirror-smooth state. An angle between the back of the rising mirror 7 and the surface of the substrate 6 is preferably arranged so as to increase light received on the light-receiving element 4. For example, when the back is arranged perpendicular to the surface of the substrate 6, the rising mirror 7 can be readily formed.

With the rising mirror 7, even when an element of the end face emitting type such as a semiconductor laser is used as the light-emitting element 5, it is easy to integrate and arrange all the optical elements on a single substrate 6.

Moreover, in order to efficiently gather transmitted light and received light with a single light-gathering mirror 3 and to couple the light to the optical fiber 2, it is more desirable that the emitting positions of the light-receiving element 4 and the light-emitting element 5 be close to each other.

As described in Embodiment 1, when the light-emitting element 5 is disposed on a side of the substrate 6 (surface on which the light-receiving element 4 is not provided), in view of passivation on the light-receiving element 4, it is difficult to bring the end of the light-receiving surface of the light-receiving element 4 close to the emitting position of the light-emitting element 5 with a distance of about 100 $\mu$m or less.

However, it is relatively easy to form the rising mirror 7 near the light-receiving element 4 with the same effect achieved by bringing the light-emitting element 5 close to the light-receiving element 4. Thus, with the rising mirror 7, transmitted light and received light can be more efficiently coupled to the optical fiber 2.

(Variation 5)

Figure 8A:
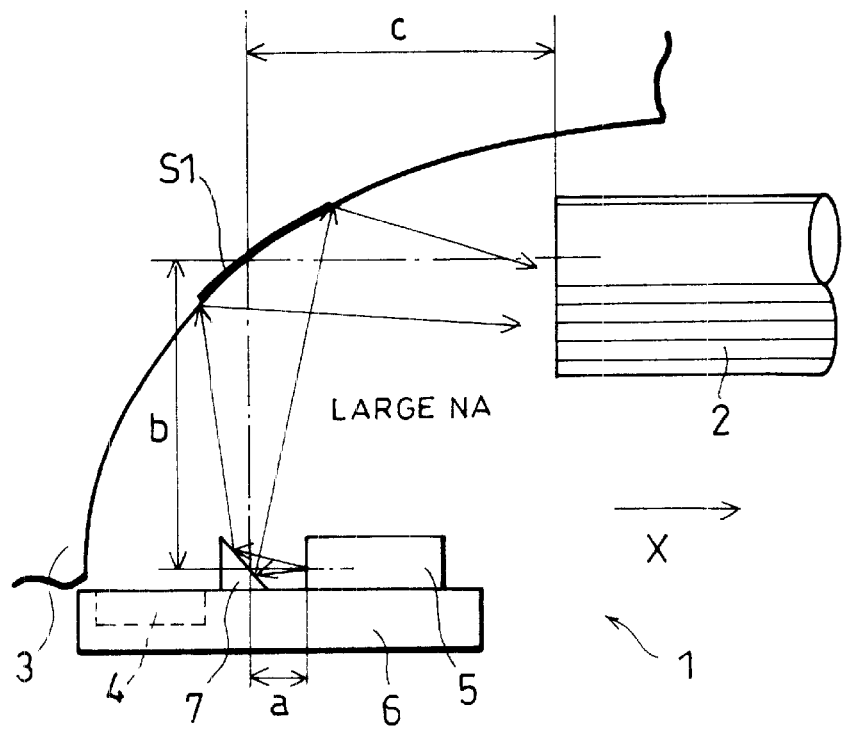
FIG. 8(a) is a sectional view schematically showing an optical path from a light-emitting element in a rising mirror of FIG. 6.
Figure 8B:
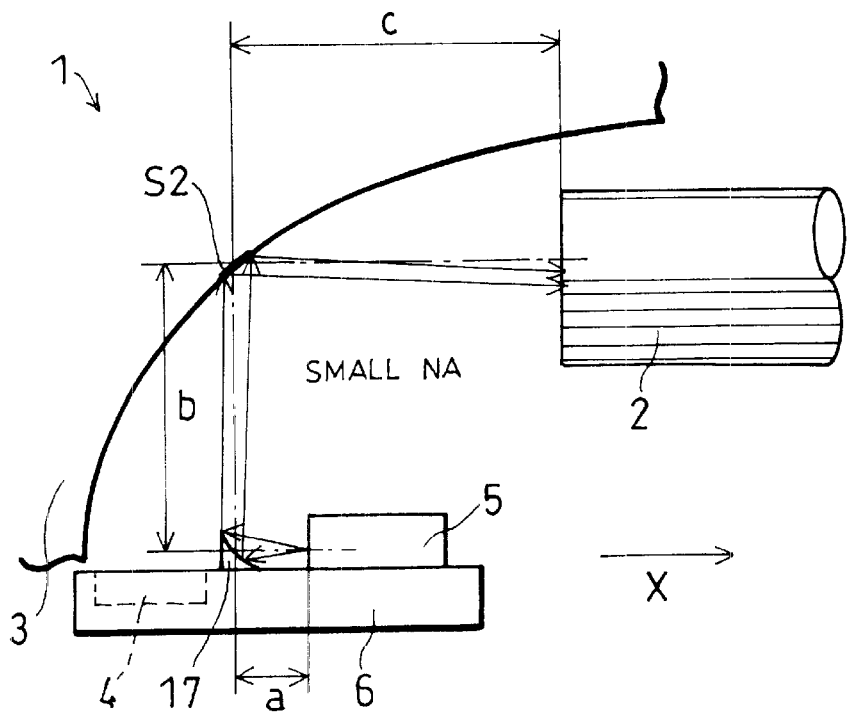
FIG. 8(b) is a sectional view schematically showing variation of the rising mirror shown in FIG. 6.
Figure 9:
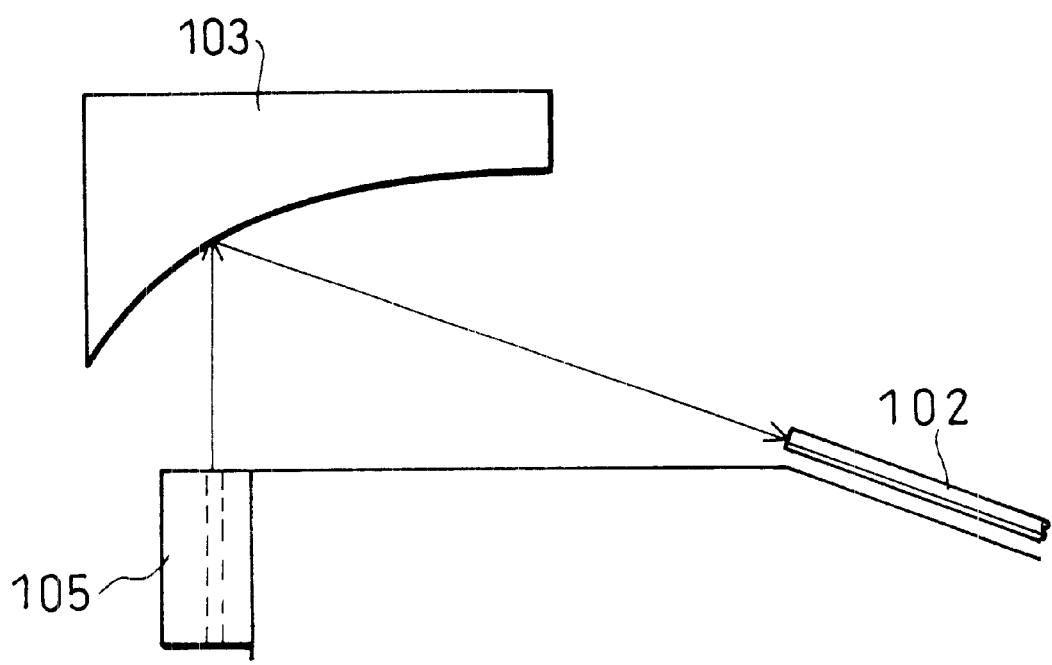
FIG. 9 is an explanatory drawing showing a construction of a conventional optical communication device.
Figure 10:
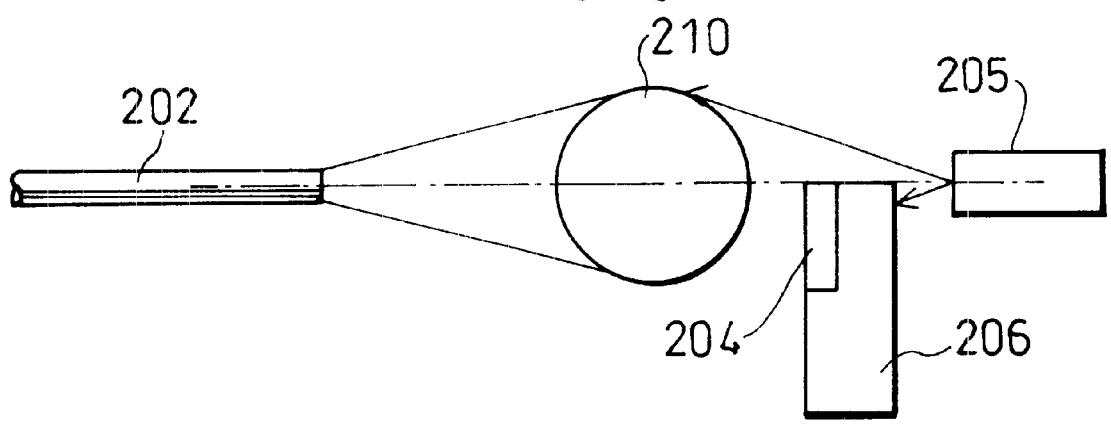
FIG. 10 is an explanatory drawing showing a conventional two-way optical communication device.

The following explanation describes another variation of the rising mirror 7. FIG. 8(a) shows the triangular rising mirror 7 of FIG. 6. FIG. 8(b) shows a rising mirror 17 of the present variation, that has a reflecting surface formed into a concave and curved surface. Further, in these figures, optical paths of light beams emitted from the light-emitting element 5 are shown by arrows.

As for the rising mirror 17 of FIG. 8(b), the concave and curved reflecting surface is arranged such that light transmitted from the light-emitting element 5 reaches the light-gathering mirror 3 with a small diameter. Namely, the rising mirror 17 is arranged so as to reduce an NA of transmitted light. Hence, the light-gathering mirror 3 can gather light transmitted to the optical fiber 2 with a small NA, so that the arrangement can be readily completed.

Further, since the NA is small, it is possible to achieve resistance(redundancy) to a positional shift of the light-gathering mirror 3 in a direction X of FIG. 8(*b*) (from the light-gathering mirror 3 to the optical fiber 2). Namely, it is possible to raise an acceptable level of irregularity including a positional shift. Particularly, when a semiconductor laser is used as the light-emitting element 5, a radiation angle is relatively large perpendicularly to the substrate 6; thus, as shown in FIG. 8(*b*), it is desirable to increase a curvature of the rising mirror 17 so as to form a concave shape.

Here, the following case is taken as an example: the multimode optical fiber 2 having a large diameter of 200 μm to 1 mm is used, and the light-emitting element (semiconductor laser) 5 and the light-receiving element 4 are mounted on the substrate 6. A typical semiconductor laser 5 as the light-emitting element has a vertical radiation angle (half band width) of about 30°. In the construction of FIG. 8(*a*), if a distance of a+b is not short between an end face of the light-emitting element 5 and the light-gathering mirror 3, an emitting area S1 for emitting transmitted light to the light-gathering mirror 3 is increased.

As a result, it becomes difficult to arrange the curved surface of the light-gathering mirror 3 and to reduce an NA after reflection, thereby reducing efficiency of coupling to the optical fiber 2. Moreover, the above-mentioned resistance to a positional shift in the X direction (along the length of the optical fiber 2) is reduced.

In FIG. 8(*b*), an NA is reduced. Namely, the rising mirror 17 has the function of reducing radiation of light transmitted from the light-emitting element 5 so as to reduce an emitting area S2 for emitting transmitted light to the light-gathering mirror 3. Consequently, it is possible to extend the range of arrangements of the light-gathering mirror 3. Further, since the NA is small, the superior capability of gathering transmitted light is achieved, so that it is possible to bring the optical fiber 2 close to the light-gathering mirror 3. Therefore, it is possible to reduce divergence of received light that is emitted from the optical fiber 2, achieving an efficient coupling to the light-receiving element 4.

Additionally, in FIGS. 8(*a*) and 8(*b*), when a distance is "a" between the end face of the light-emitting element 5 and the rising mirrors 7 and 17, a distance is "b" between the light-gathering mirror 3 and the rising mirrors 7 and 17, and a distance is "c" between the light-gathering mirror 3 and the end face of the optical fiber 2, the arrangement satisfying c>b>a is preferable. Here, the above distances refer to distances on an optical axis.

The arrangement satisfying c>b is preferable for the following reasons: as for the optical fiber 2, the smaller an NA is, the smaller mode dispersion is, so that light can be favorably transmitted particularly at a high speed, and when light emitted from the light-emitting element 5 has a larger NA, the light cannot be coupled to the optical fiber 2, resulting in loss.

The arrangement of b>a is preferable for the following reason: the light-emitting element 5 and the light-receiving element 4 need to be formed on a single substrate 6 to increase efficiency of coupling to the optical fiber 2. When the distance "a" is large, still larger rising mirrors 7 and 17 are necessary in view of a radiation angle of the light-emitting element 5, so that it is difficult to form the light-emitting element 5 and the light-receiving element 4 on the substrate 6. For example, it is desirable to set the distance "a" at about several tens μm, the rising mirrors 7 and 17 at 100 μm or less in height, and the distance "b" at about 1 mm.

When the distance "a" needs to be longer, it is also possible to insert a waveguide between the light-emitting element 5 and the rising mirrors 7 and 17 on an optical path. As mentioned above, the construction satisfying c>b>a makes it possible to achieve a still smaller two-way optical communication device 1.

Furthermore, it is desirable to arrange the surface of the substrate 6 and an optical axis of the optical fiber 2 in parallel with each other. This arrangement makes it possible to mount the optical fiber 2 and the two-way optical communication device 1 on a plane surface, so that it is easy to secure a space for installing a circuit substrate and to assemble the substrate 6, thereby completing the smaller two-way communication device 1.

As described above, in the two-way optical communication device 1 of Embodiment 2, the optical elements are integrated on a single substrate 6, so that it is possible to obtain the small two-way optical communication device 1 and two-way optical communication link 10 with high reliability and performance.

Here, in the present embodiment, the reflecting surface of the light-gathering mirror 3 is seamlessly formed by a smoothly curved surface; however, the reflecting surface can be formed by separate surfaces. For example, a part of the reflecting surface is formed by a curved surface being suitable for coupling transmitted light to the optical fiber 2, and the rest of the reflecting surface is formed by a curved surface being suitable for emitting received light onto the light-receiving element 4; thus, it is possible to increase efficiency of utilizing light both for coupling transmitted light and for emitting received light.

Particularly, in the case of the concave rising mirror 17 of FIG. 8(*b*), an area S2 for receiving transmitted light in the light-gathering mirror 3 is reduced. Thus, the area S2 is formed by a curved surface suitable for coupling transmitted light to the optical fiber 2, and the other part is formed by a curved surface suitable for emitting received light to the light-receiving element 4, so as to increase efficiency of utilizing light.

Additionally, the construction of the present embodiment is one of the examples. Even when the construction is partially modified, the same effect can be achieved.

According to the present invention, the light-gathering mirror 3 is used at the time that light received from the optical fiber 2 is gathered and is coupled to the light-receiving element 4, so that a light-gathering state can be readily varied by changing a curvature of the light-gathering mirror 3. For example, even in the case of the optical fiber 2 such as a POF having a large diameter, light can be coupled to the light-receiving element 4 with high efficiency.

Further, transmitted light is coupled to the optical fiber 2 via the same light-gathering mirror 3; thus, transmission and reception is possible with a single optical fiber 2, and it is possible to obtain a small two-way optical communication device 1 and two-way optical communication link 10 at low cost without necessity for separating transmitted light and received light.

In the two-way optical communication device 1, it is preferable that at least a part of the area for reflecting transmitted light overlaps a part of the area for reflecting received light.

According to this arrangement, the two-way optical communication device 1 can be smaller, and transmitted light can be emitted virtually in parallel with an optical axis of the optical fiber 2, thereby achieving high efficiency.

In the two-way optical communication device 1, it is preferable that the light-gathering mirror 3 reduces numerical apertures of the transmitted light and directs the light to the optical fiber 2.

Regarding light transmitted to the optical fiber 2, the smaller an NA is, the higher efficiency of coupling to the optical fiber 2 is, and the mode dispersion is smaller after the light is propagated through the optical fiber 2. Hence, in this arrangement, the light-gathering mirror 3 changes an NA of transmitted light into smaller one so as to obtain a more efficient two-way optical communication device 1.

The two-way optical communication device 1 is preferably provided with an optical member which reduces numerical apertures of light transmitted from the light-emitting element 5 and directs the light to the light-gathering mirror 3.

According to this arrangement, it is possible to reduce divergence of transmitted light that is reflected to the light-gathering mirror 3, so that transmitted light can be gathered more easily. Further, it is possible to couple transmitted light to the optical fiber 2 and to emit received light to the light-receiving element 4 with high efficiency.

In the two-way optical communication device 1, it is preferable that the light-emitting element 5 is an end face emitting type and is disposed on the substrate 6 on which the light-receiving element 4 is mounted, and a rising mirror 7 is provided for directing light transmitted from the light-emitting element 5 to the light-gathering mirror 3.

According to this arrangement, it is possible to manufacture a reliable two-way optical communication device 1 at low cost by using a semiconductor process. Additionally, the rising mirror 7 is disposed near the light-receiving element 4 so as to bring the light-receiving element 4 close to a rising position of transmitted light; thus, transmitted light and received light can be coupled to the optical fiber 2 with higher efficiency.

Moreover, in the two-way optical communication device 1, it is preferable that the rising mirror 7 has a concave and curved surface for reducing numerical apertures of light transmitted from the light-emitting element 5.

With this arrangement, it is possible to reduce divergence of transmitted light that is reflected to the light-gathering mirror 3, so that transmitted light can be gathered to the optical fiber 2 more easily. Further, it is possible to couple transmitted light to the optical fiber 2 and to emit received light to the light-receiving element 4 with high efficiency.

In the two-way optical communication device 1, it is preferable that the substrate 6 and the optical axis of the optical fiber 2 are arranged in parallel with each other. This arrangement makes it possible to mount the optical fiber 2 and the two-way optical communication device 1 on a plane surface, so that it is easy to assemble the two-way optical communication link 10, thereby readily completing the smaller device 1 and link 10.

The invention being thus described,. it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-way optical communication device, comprising:
   a light-emitting element for generating modulated light in accordance with a data signal, as transmitted light, and emitting said transmitted light to be propagated via an optical fiber,
   a light-receiving element for receiving light propagated via said same one optical fiber, for generating said data signal, and
   a concave mirror which reflects the transmitted light so as to couple the light to an end face of said same one optical fiber and reflects the received light emitted from the end face so as to emit the light to said light-receiving element.

2. The two-way optical communication device as defined in claim 1, wherein at least a part of an area for reflecting the transmitted light and at least a part of an area for reflecting the received light overlap each other on said light-gathering mirror.

3. The two-way optical communication device as defined in claim 1, wherein said light-gathering mirror reduces a numerical aperture of said transmitted light and directs the light to said optical fiber.

4. The two-way optical communication device as defined in claim 1, further comprising an optical member which reduces a numerical aperture of light transmitted from said light-emitting element and directs the light to said light-gathering mirror.

5. The two-way optical communication device as defined in claim 1, further comprising a rising mirror which directs light transmitted from said light-emitting element, to said light-gathering mirror.

6. The two-way optical communication device as defined in claim 5, wherein said rising mirror has a concave and curved surface so as to reduce a numerical aperture of light transmitted from said light-emitting element.

7. The two-way optical communication device as defined in claim 5, further comprising a substrate on which said light-receiving element is mounted,
   wherein said light-emitting element is an end face emitting type and is disposed on said substrate.

8. The two-way optical communication device as defined in claim 7, wherein transmitted light from said light-emitting element has an optical axis being arranged virtually in parallel with a surface of said substrate.

9. The two-way optical communication device as defined in claim 1, further comprising a substrate on which said light-receiving element and said light-emitting element are disposed,
   wherein said light-receiving element on said substrate has a light-receiving surface being in parallel with an optical axis of said optical fiber.

10. The two-way optical communication device as defined in claim 1, wherein said light-gathering mirror has a mirror surface which is rotating elliptic.

11. The two-way optical communication device as defined in claim 10, wherein said optical fiber, said light-receiving element, and said light-emitting element are arranged respectively in accordance with focal positions on the mirror surface of said light-gathering mirror.

12. The two-way optical communication device as defined in claim 11, wherein said optical fiber is disposed in accordance with one of the focal positions on the mirror surface of said light-gathering mirror, and said light-receiving element and said light-emitting element are disposed in accordance with the other focal position on the mirror surface of said light-gathering mirror.

13. The two-way optical communication device as defined in claim 1, wherein the light-receiving surface of said light-receiving element is formed into a bow shape.

14. The two-way optical communication device as defined in claim 1, wherein a light-receiving surface of said light-receiving element and an emitting position of light transmitted from said light-emitting element are close to each other.

15. A two-way optical communication apparatus, comprising a plurality of two-way optical communication devices, each being optically coupled to each end of an optical fiber so as to conduct two-way optical communication, wherein at least one of a plurality of said two-way optical communication devices includes a concave mirror, and said concave mirror reflects light transmitted from a light-emitting element so as to couple the light to an end of said same one optical fiber and said mirror reflects light received from the end of said same one optical fiber so as to emit the light onto a light-receiving element.

* * * * *